April 5, 1960 D. M. LONG 2,931,422
METHOD AND APPARATUS FOR FORMING FIBROUS GLASS
Filed Oct. 26, 1954 8 Sheets-Sheet 1

INVENTOR.
DAVID M. LONG
BY
ATTORNEYS

INVENTOR.
DAVID M. LONG

April 5, 1960  D. M. LONG  2,931,422

METHOD AND APPARATUS FOR FORMING FIBROUS GLASS

Filed Oct. 26, 1954  8 Sheets-Sheet 4

INVENTOR.
DAVID M. LONG
BY
ATTORNEYS

April 5, 1960　　　　　　　D. M. LONG　　　　　　　2,931,422
METHOD AND APPARATUS FOR FORMING FIBROUS GLASS
Filed Oct. 26, 1954　　　　　　　　　　　　　　　　8 Sheets-Sheet 5

Fig. 7

INVENTOR.
DAVID M. LONG
BY
ATTORNEYS

April 5, 1960 D. M. LONG 2,931,422
METHOD AND APPARATUS FOR FORMING FIBROUS GLASS
Filed Oct. 26, 1954 8 Sheets-Sheet 6

INVENTOR.
DAVID M. LONG
BY
ATTORNEYS

April 5, 1960 D. M. LONG 2,931,422
METHOD AND APPARATUS FOR FORMING FIBROUS GLASS
Filed Oct. 26, 1954 8 Sheets-Sheet 7

Fig. 10

INVENTOR.
DAVID M. LONG
BY
ATTORNEYS

April 5, 1960 D. M. LONG 2,931,422
METHOD AND APPARATUS FOR FORMING FIBROUS GLASS
Filed Oct. 26, 1954 8 Sheets-Sheet 8

INVENTOR.
DAVID M. LONG
BY
ATTORNEYS

United States Patent Office 2,931,422
Patented Apr. 5, 1960

2,931,422

METHOD AND APPARATUS FOR FORMING FIBROUS GLASS

David M. Long, Newark, Ohio, assignor to Owens-Corning Fiberglas Corporation, a corporation of Delaware Application October 26, 1954, Serial No. 464,721

5 Claims. (Cl. 154—29)

This invention relates to an improved method and apparatus for producing fibrous glass or other thermoplastic materials which exhibit properties similar to glass and especially to application of binder and other treating compositions to the products of such methods and apparatus.

It is an object to provide an improved process for producing fine diameter fibers at greatly reduced costs.

It is a further object to provide such processes in which the efficiency of binder application is greatly improved.

It is also an object to provide method and apparatus for the production of bonded fibrous glass or similar thermoplastic fibers which provides for intimate mixture of the binder and fibers during forming.

It is an object to improve centrifugal fiber forming processes and the products thereof.

Further objects will be apparent from the description which follows in connection with the drawings, wherein.

Basically, the apparatus comprises means for providing a supply of molten glass or other thermoplastic material, a rotor or spinner adapted for receiving a stream of molten glass and emitting viscous primaries of glass from its periphery due to the effects of centrifugal action, a means for changing the temperature of the primary to that temperature at which it can be attenuated, means for rotating the spinner, means for changing the direction of the fibers and at the same time applying a force which attenuates the primaries into fine diameter fibers, and means for applying a binder or treating composition to the fibers as they are being formed.

Several forms of the apparatus are shown in the drawings; each of the forms of the apparatus utilizes centrifugal force for forming primary fibers and then the fibers or primaries are attenuated into much smaller diameter fibers by the action of a gaseous blast. The objects of this invention are attained by first forming a cylinder of fibers which passes downwardly from the forming section and then applying a liquid spray of binder or air-dispersed binder onto this cylinder substantially as shown in the drawings. In certain forms of the apparatus further advantages are achieved as follows. The cylinder of fibers which tends to spiral slowly as it passes downwardly from the spinner is stopped from turning by use of air jets or jets of dispersed binder and then the cylinder of fibers is broken up as desired prior to collecting the fibers upon a suitable collection device as will be described with reference to the drawings.

Figures 1, 2:
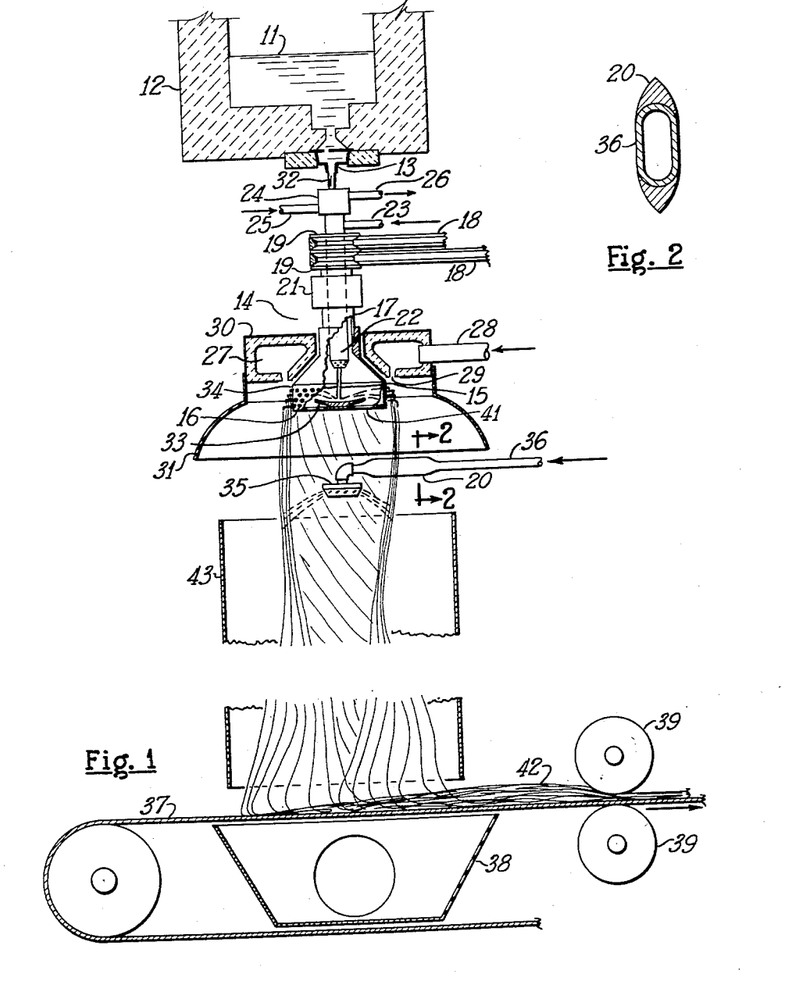
Figure 1 is an elevational view of apparatus used in carrying out the invention, parts being in section.
Figure 2 is a cross-sectional view on line 2—2 of Figure 1.

In Figure 1, molten glass 11 in forehearth 12 flows through a feeder in the form of a stream 32 which passes downwardly into the fiber forming apparatus. The centrifugal apparatus 14 comprises a spinner 15 having a plurality of small diameter openings 16, 16, which spinner is mounted upon shaft 17 driven by belts 18, 18 in sheaves 19, 19. Shaft 17 is provided with a bearing 21 in which it is journalled. Inside of shaft 17 is non-rotative burner 22 which has an inlet for air and fuel mixture, the inlet being designated by numeral 23. The burner is provided with a water-cooled jacket 24 having a water inlet 25 and a water outlet 26, which jacket extends from the inlet 25 to the burner nozzle. Disposed about spinner 15 is an annular burner 27 which is provided with a fuel-air inlet 28 and an annular outlet 29 for products of combustion. The annular burner 27 is a steel-enclosed, refractory-lined device adapted for burning fuel-air mixtures and emitting the products of combustion in the form of an annular blast. The burner is provided with a steel jacket 30 and a skirt 31.

A stream of glass 32 from feeder 13 passes downwardly through shaft 17 and into spinner 15 where it falls upon a slinger plate 33. The spinner is rotated and the molten glass falling onto slinger plate 33 moves outwardly toward vertical band 34 in which small diameter openings 16, 16 are located. The glass flows over the extent of the vertical band and passes outwardly through small diameter openings 16, 16 in the form of a plurality of viscous primaries. It is sometimes necessary to add heat to the molten glass in order to attenuate the primaries into very fine diameter fibers. This is done by directing the blast from annular burner 27 against the viscouse primary fibers. The products of combustion from annular burner 27 pass downwardly about the periphery of the spinner 15 and add heat to the viscous primaries being exuded from the spinner, and, in addition, change the direction of the viscous primaries and move the fibers downwardly as they are being attenuated.

It is necessary when starting the apparatus and when operating at low production rates to add heat inside the spinner by operating burner 22.

Disposed below spinner 15 is binder nozzle 35 which is supported by binder inlet pipe 36. The inlet pipe has a streamlined configuration as indicated by numeral 20 and as shown in cross section in Figure 2. Below the fiber forming apparatus is a conveyor 37 provided with a suction box 38 and a pair of compression rolls 39, 39.

In operating the apparatus shown in Figures 1 and 2, burner 22 is started by introducing a flame through stingout ports 41, 41 in spinner 15 to light the fuel-air mixture from fuel-air inlet 23. A stream of molten glass from feeder 13 is introduced into spinner 15 and the rotation of the spinner is commenced. As the stream of molten glass strikes slinger plate 33 the glass is thrown outwardly due to the effects of centrifugal force and the glass forms a thin film on the inner side of the vertical band 34. The viscous glass flows through small diameter openings 16, 16 in the form of primaries. The annular burner 27 is lighted and the blast therefrom passes through outlet 29 and downwardly around the outer periphery of spinner 15 in the form fo a circular blast. Heat is added to the viscous primaries at the same time that the primaries are turned approximately 90° so that they are passing downwardly away from rotating spinner 15. The primary fibers are attenuated into very small diameter fibers by the action of the blast from annular burner 27.

A cylinder of fibers moves downwardly from spinner 15. Since the blast from the annular burner and the air about the cylinder of fibers tend to hold or resist turning of the cylinder as it moves downwardly away from spinner 15, a spiral is formed in the cylinder of fibers. The spinner continually rotates while the cylinder of fibers moves downwardly causing a cylinder of spiralled fibers to be formed.

As the cylinder of fibers moves downwardly past binder nozzle 35, a metered quantity of finely dispersed binder is applied to the fibers and the mixture of fibers and binder drops downwardly onto conveyor belt 37 and forms a mat 42 thereon. If desirable, a forming hood 43 is used to control further the deposition of the fibers and binder upon conveyor belt 37. As the mat 42 of fibers passes between compression rolls 39, 39 the mat is increased in density and the product is then directed to an oven, not shown, for further treatment if such is necessary. For instance, if phenol formaldehyde binder is applied, a curing oven is adjacent the fiber forming apparatus so that the mat passes through this oven as it emits from compression rolls 39, 39. The fibers being formed do not hang up on the binder inlet pipe but rather pass downwardly around it in the form of a cylinder which is then treated with binder as described. The compression rolls are optional and are used only when desired.

By applying the binder, either in the form of a liquid dispersion or powdered binder dispersed in air or any other suitable gas, into the cylinder of fibers formed with the apparatus of Figure 1, intimate mixing of the fibers and binder is achieved. This mixture of fibers and binder passes downwardly and is collected upon conveyor belt 37 in the form of a mat. The mat of fibers acts as a filtering medium which filters out the binder particles and thereby becomes covered with a sufficient quantity of binder to give the desirable properties in the final product. The binder content of the product can be widely varied; a light sprinkling of powder or liquid binder may be applied or the mat of fibers may be saturated with binder.

Figure 3:
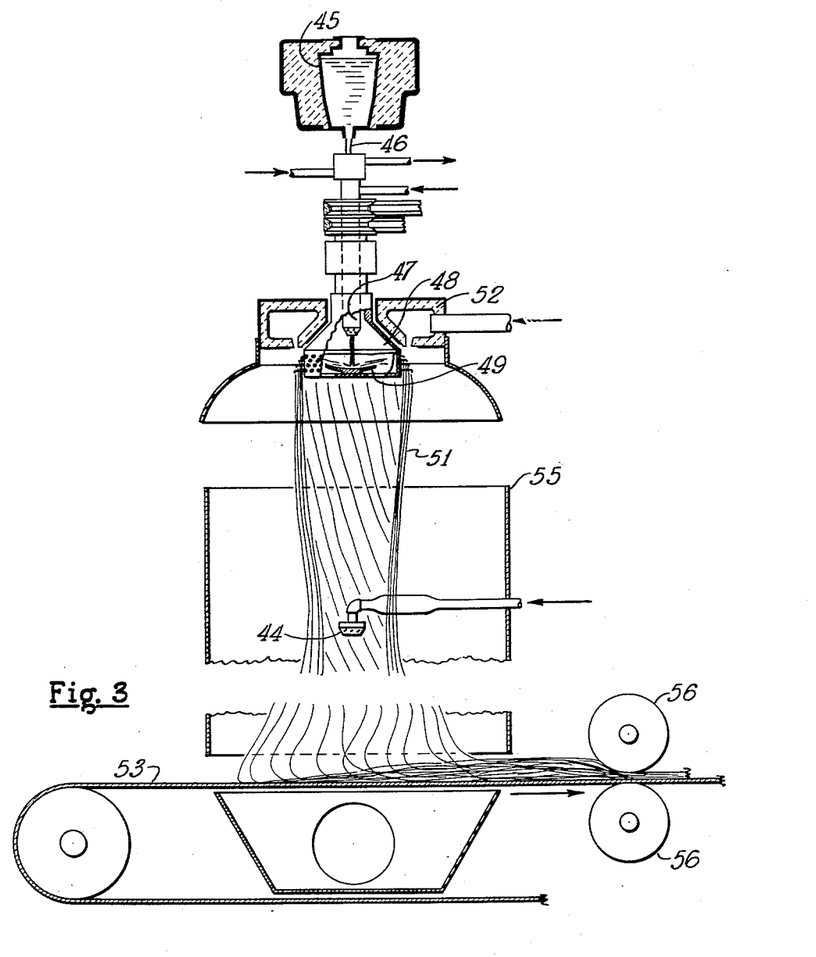
Figure 3 is an elevational view of apparatus of the invention showing a modification in the position of the binder nozzle, parts being in section.
Figure 4:
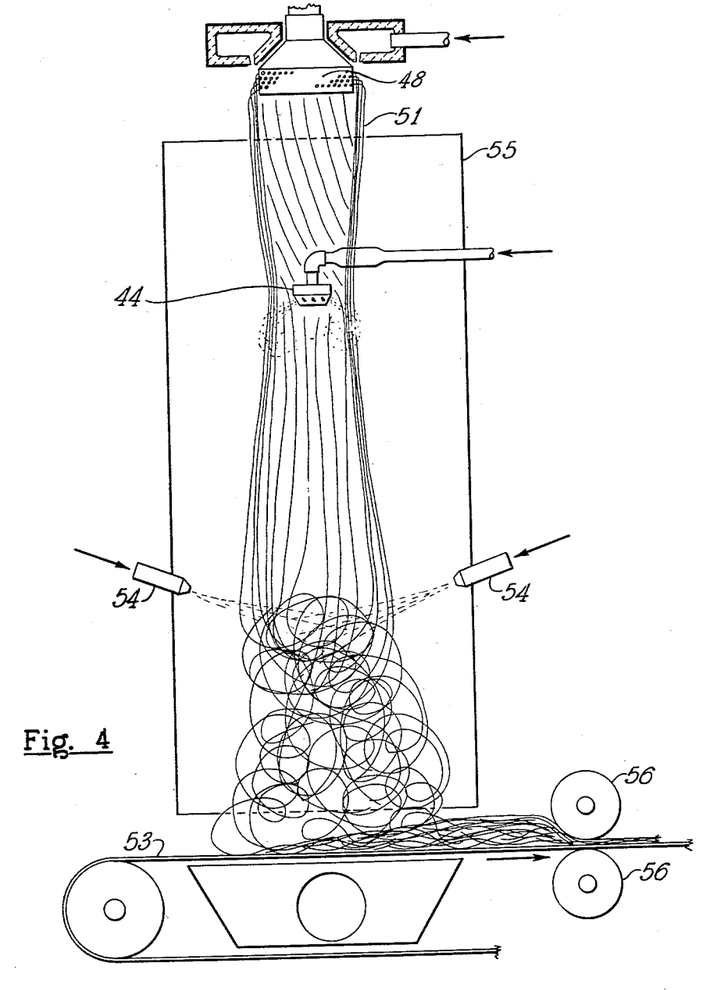
Figure 4 is an elevational view of a part of the apparatus shown in Figure 3.

In Figures 3 and 4 another embodiment of the invention is shown wherein binder nozzle 44 is positioned further below spinner 48. A glass melter 45 adapted for melting glass cullet provides a bath of molten glass from which a small stream of molten glass 46 flows and passes downwardly through internal burner 47 and into spinner 48. The stream of molten glass strikes slinger plate 49 and is thrown outwardly due to the effect of centrifugal force to the inner periphery of the perforated wall of spinner 48. The cylinder of fibers 51 passes downwardly from spinner 48 in the form of a vortex. At the smallest diameter of the vortex is positioned binder nozzle 44, see Figure 4. The blast of combustion products from annular burner 52 and the air which fills collection hood 55 tends to prevent rotation of the cylinder of fibers 51 and causes a spiral to form in the cylinder of fibers as the cylinder passes downwardly away from rotating spinner 48.

Figure 5:
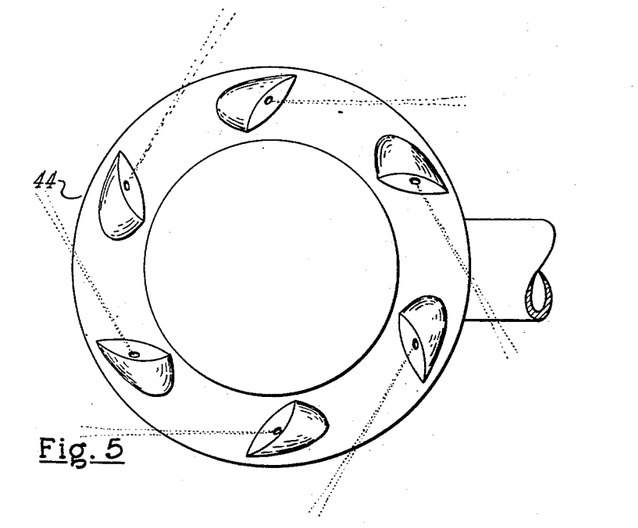
Figure 5 is an enlarged bottom view of the binder nozzle showing the path of the binder spray from the nozzle.
Figure 6:
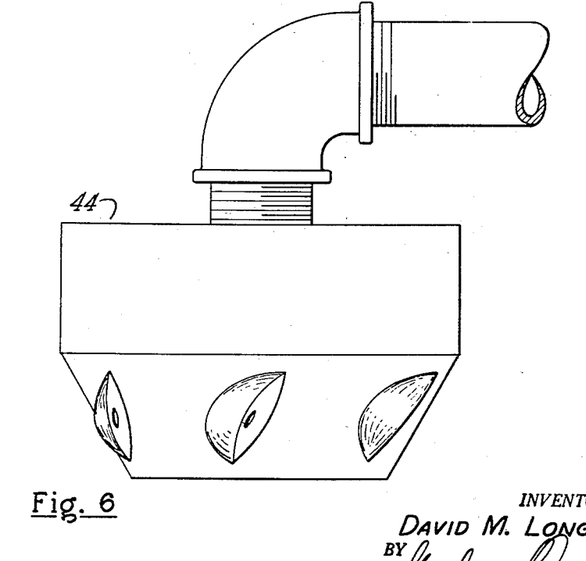
Figure 6 is an enlarged view of the binder nozzle.

Binder nozzle 44 is preferably one such as that shown in Figures 5 and 6. A pattern of binder spray such as that shown in Figure 5 is emitted in a direction contra to that of the rotation of the cylinder of fibers 51. The rotation of the cylinder of fibers 51 is substantially stopped as the cylinder of fibers reaches binder nozzle 44 in its travel downwardly from spinner 48. The integrity of the cylinder of fibers 51 is reduced and the fibers drift downwardly and are collected upon conveyor belt 53. The cylinder of fibers 51 is further broken up by the action of blasts of air from air jets 54, 54 disposed within hood 55. These air jets are optional. The fibers are compacted upon conveyor belt 53 and then passed between rolls 56, 56 as was done formerly with the apparatus in Figures 1 and 2.

A nozzle which emits powdered binder dispersed in air in a pattern such as that shown in Figure 5 may be used to counteract the rotation of the cylinder of fibers 51; however, a spray of binder dispersed in a liquid is more effective for this purpose. In another embodiment of the invention, the rotation of the cylinder of fibers and the spiral produced by the rotation of the spinner is stopped by placing an air nozzle above the binder nozzle to direct air jets in a pattern such as that shown in Figure 5 in order to counteract the turning of the cylinder of fibers 51. When such air jets are used, the binder nozzle may either produce a pattern such as that shown in Figure 5 or may simply spray the binder radially outward from the binder nozzle. If a pattern such as that shown in Figure 5 is produced by the binder nozzle, the counteracting effect of the air jets is enhanced by the counteracting effect of the binder nozzle and its spray.

Figure 7:
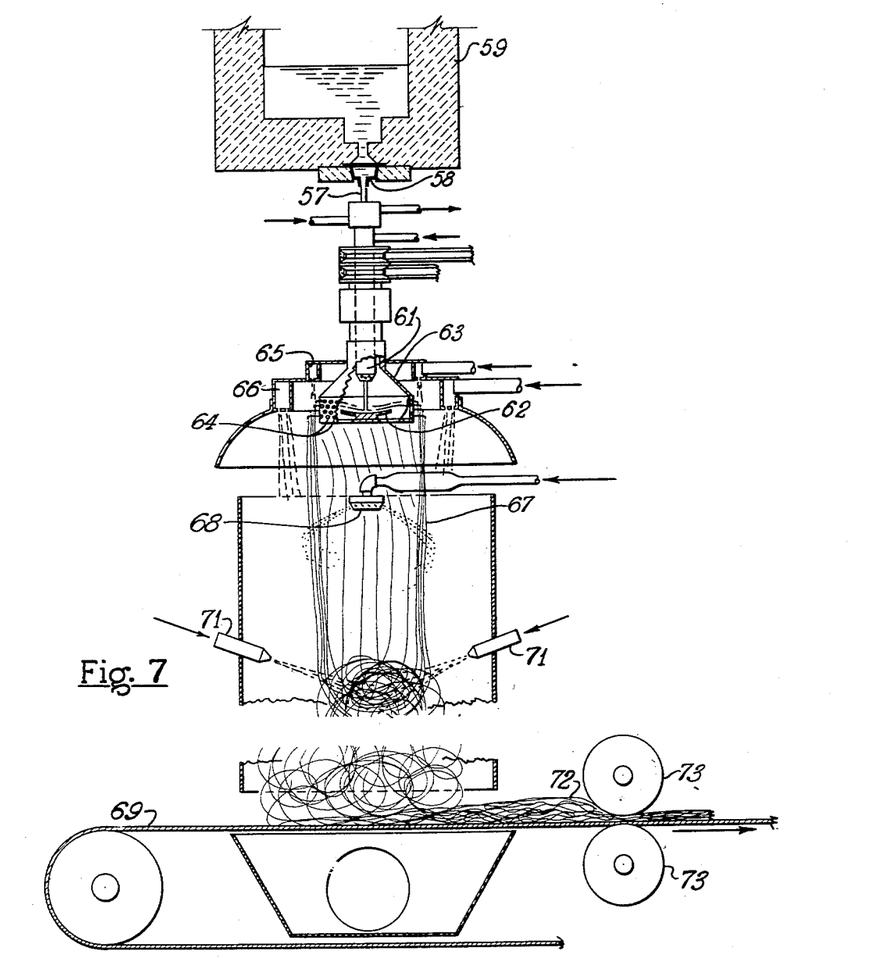
Figure 7 is an elevational view of still another form of apparatus used in carrying out the invention.

In Figure 7 is shown another embodiment of the apparatus used in carrying out the invention. In this apparatus two concentric blasts are used for attenuation, the outer being an air blast and the inner the products of combustion from the burning of the fuel-air mixture emitted from fuel-air nozzle 65. Molten glass flows in the form of a stream 57 from feeder 58 located in forehearth 59 of a glass tank, not shown. The stream of glass flows downwardly through the non-rotating internal burner 61 and strikes slinger plate 62 which is secured to the bottom of spinner 63. The molten glass which is rather viscous is slung outwardly due to the effects of centrifugal force and passes through small openings 64, 64 in the periphery of spinner 63. Disposed about spinner 63 are two annular members, one of which is a fuel-air nozzle 65 and the other of which is an air blower 66.

The fibers as they are attenuated are directed downwardly by the flame from fuel-air nozzle 65 and by the effect of the air blast from air blowers 66. The column of fibers 67 passes downwardly about binder nozzle 68 and the fibers are intimately mixed with binder particles as the fibers and binder drop downwardly and collect upon conveyor belt 69.

The cylinder of fibers 67 is broken up by directing air jets 71, 71 toward the column of fibers. The downwardly falling fibers form a mat 72 which may be compressed by the action of rolls 73, 73. The compression rolls are readily used when powdered binder is utilized, but the rolls may be dispensed with if the product need not be compacted or if the binder used is an uncured, sticky type of material.

Figures 8, 9:
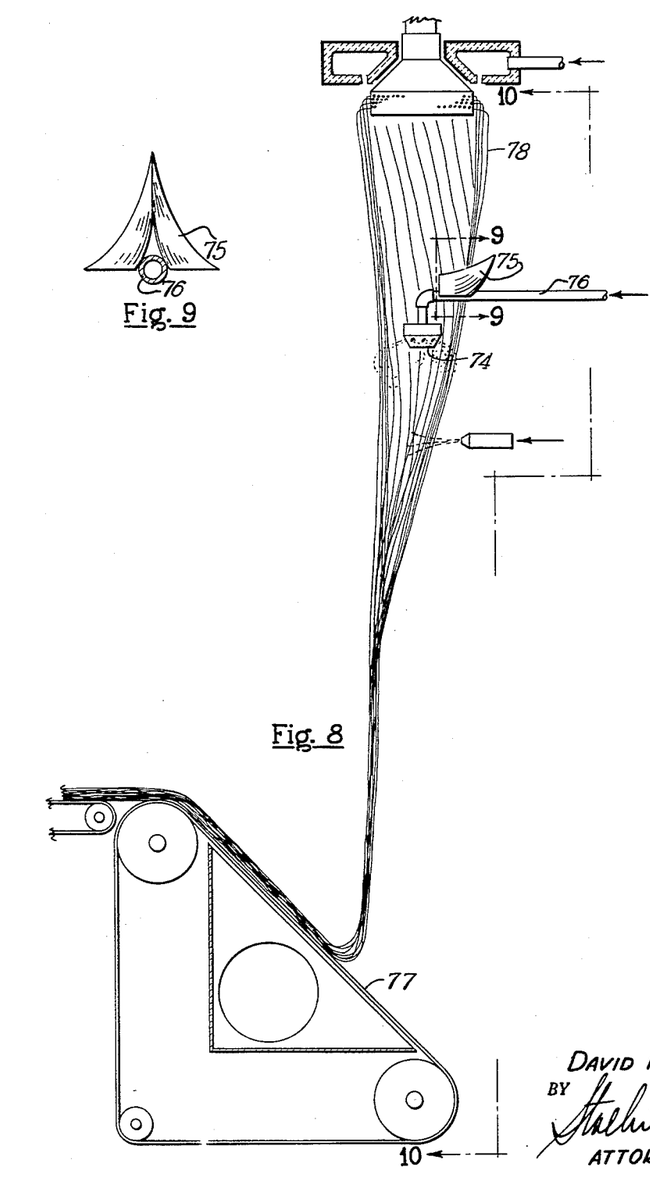
Figure 8 is an elevational view of a form of the apparatus, the supporting arm for the binder nozzle being provided with a fiber fan-cutting device.
Figure 9 is a cross-sectional view on line 9—9 of Figure 8, the fibers not being shown.
Figure 10:
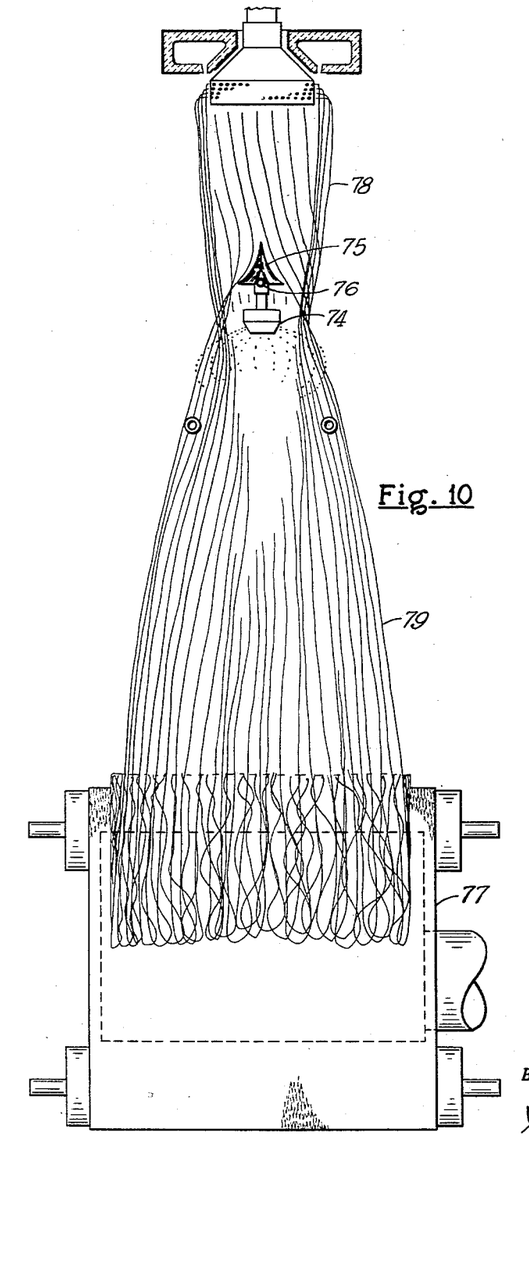
Figure 10 is a side elevational view on line 10—10 of Figure 8.

It has been found that the cylinder of fibers or the beam of fibers is quite integral and does not readily collapse to form a uniform pack of fibers upon the conveyor belt. In Figures 8, 9 and 10 is shown apparatus which cuts and opens up the cylinder of fibers to allow a single layer or veil of fibers to be deposited upon inclined conveyor belt. Binder nozzle 74 is provided with a cutting member 75 disposed above binder nozzle inlet 76. Cutting member 75 comprises a generally V-shaped member having surfaces defined by a compound curve which may be described as being saddle shaped. The cutting member is adapted for cutting the wall of the cylinder of fibers and separating the cut edges thereof so that they move away one from the other and form a substantially flat sheet of haphazardly arranged fibers that is deposited in sheet form upon inclined conveyor belt 77.

If desirable, multiple forming sections are disposed above a single inclined conveyor belt so that a laminar product comprising more than one mat of fibers is collected. Suitable resins either synthetic or natural may be laminated with the mat of fibrous glass to form a sandwich construction of glass, resin, and glass.

Binders comprising phenol formaldehyde, urea formaldehyde, starch, gelatine, epoxy resins, polyamides, polyesters, methacrylates, rubbery polymers and copolymers including butadiene-styrene, butadiene-acrylonitrile and the like or mixtures of one or more of these materials can be used either as a binder or a laminating material. Either solvent or water systems can be used although water systems are preferred for the binder.

Figures 11, 12:
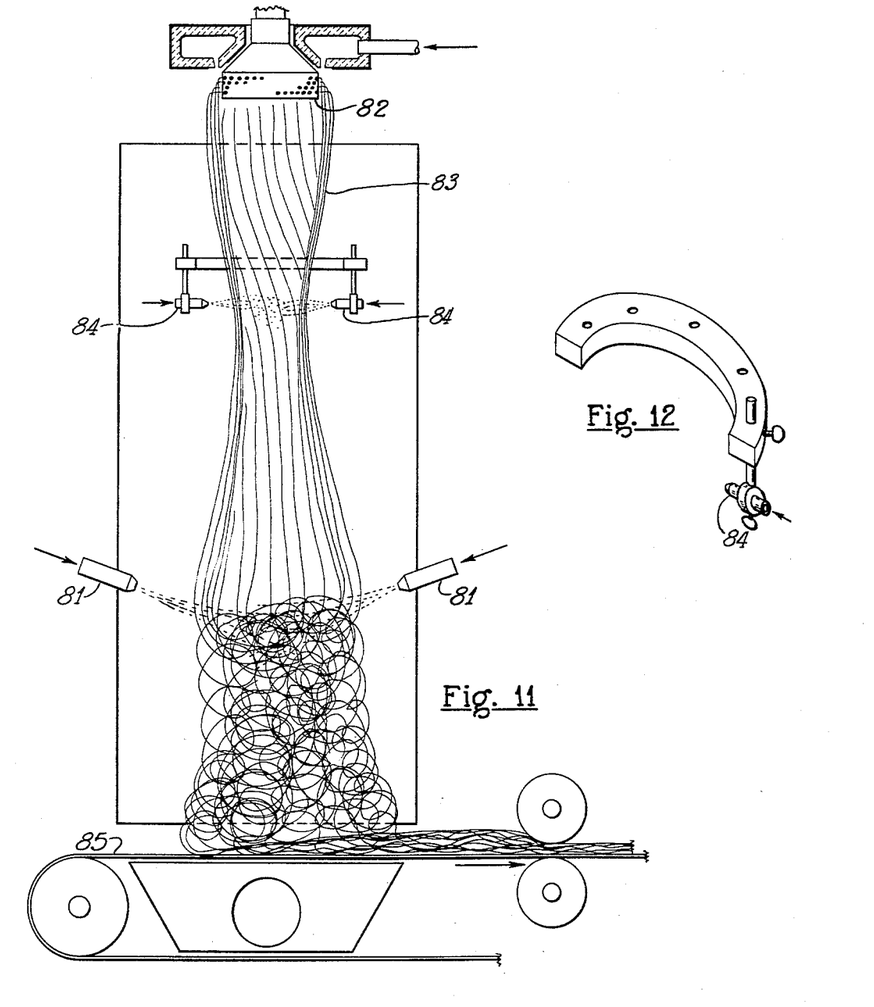
Figure 11 is an elevational view of another embodiment of the invention.
Figure 12 is a view in perspective of an external spraying device.

In Figures 11 and 12 is shown binder nozzles 84, 84 disposed on the outer side of cylinder of fibers 83. The fibers as they are attenuated move downwardly from spinner 82 in a cylinder of fibers 83 which passes through a ring of binder nozzles 84, 84. Air nozzles 81, 81 may be used if desired to disturb the integrity of the cylinder of fibers 83 and to promote the deposition of a uniform mat of fibers upon conveyor belt 85.

A low pressure area exists within the cylinder of fibers 83; therefore, the atomized binder from binder nozzles 84, 84 passed into the cylinder and intimately mixes with the fibers prior to deposition of the fibers upon conveyor 85.

Binder nozzles 84, 84 are pivotally mounted so that the binder issuing therefrom may be in a pattern which is contra to the spiral of the cylinder of fibers.

Binder may be applied to the inner and outer sides of the cylinder of fibers simultaneously, if desired. If desirable, the binder guns of this invention are used to accentuate the spiralling and reduction of diameter of the cylinder of fibers.

When the pattern of binder jets is travelling in the direction of the spiral in the cylinder of fibers such an accentuation results. The cylinder of fibers is reduced in diameter and directed through an air gun or an air turbine adapted for receiving the fibers and twisting or otherwise forming them into an integral bundle of fibers.

Various modifications can be made in the apparatus as shown in the drawings; for instance, the binder nozzles may be arranged so that they spray upwardly contra to the flow of the fibers which are descending in the general form of a cylinder or they may spray finely divided binder radially at any desired angle toward the descending fibers. It has been found to be preferred to direct a finely divided binder either dispersed in air or a liquid generally in a path following the descent or travel of the fibers in order to achieve intimate mixing of the fibers and binder and complete coverage of the individual fibers with binder.

The jets of air and/or binder enhance the attenuation resulting from the blast from the annular burner and/or from the annular blower.

If desirable, an air jet is directed toward the inlet pipe upon which the binder nozzle is supported in order to free the inlet pipe of fibers which may tend to collect thereon. This air jet may serve a dual purpose in that it not only frees the inlet pipe of fibers but also may open up the one wall of the descending cylinder of fibers to cause the cylinder of fibers to assume a flat sheet configuration that is more easily collected.

Various forms of binder guns and/or air guns may be used. Guns comprising a liquid ejecting port surrounded by an air port concentrically arranged about the liquid port and one or more converging air ports disposed about the liquid port may be used. Air operated guns adapted for blowing atomized binder particles with no liquid carrier may also be used. It is desirable to have complete atomization of the binder so that very intimate mixing of the fibers and binder may be achieved. Application of very fine particles of binder or a dispersion of very fine particles in a liquid is desirable and although the initial velocity of the binder from the binder nozzle may be extremely high, it is desirable to have a mist of binder formed instead of applying large droplets of binder upon the fibrous glass.

A binder nozzle such as that shown in Figures 5 and 6 has a dual function in that it not only applies binder to the fibers but also it counteracts the rotation of the cylinder of fibers and makes it possible to collapse the cylinder of fibers so that the fibers may be more readily collected in the desired mat form.

Modifications and variations may be made within the spirit and scope of the appended claims.

I claim:

1. In a centrifugal fiber-forming process comprising directing a stream of molten material onto a rotating member whereupon radially extending primary fibers are formed from a plurality of streams of molten material by centrifugal force, and attenuating said radially extending primary fibers by directing an annular blast toward said radially extending fibers to form an advancing cylindrical beam of spiraling, fine diameter fibers, the improvement comprising the steps of directing a binder forcibly into said advancing cylindrical beam of spiraling, fine diameter fibers in the form of a plurality of adjacent streams of binder which facilitate the attenuation and advancement of the spiraling fine diameter fibers and in a direction which opposes the spiraling of the fibers to reduce the spiraling of the fibers, and collecting the mixture of binder and fibers on a suitable surface whereby the binder collects upon the fiber surfaces.

2. In a centrifugal fiber-forming process comprising directing a stream of molten material onto a rotating member whereupon radially extending fibers are formed from a plurality of streams of molten material by centrifugal force and attenuating said radially extending primary fibers by directing an annular blast toward the fibers to form an advancing cylindrical beam of spiraling, fine diameter fibers, the improvement comprising the steps of introducing a binder into the spiraling, fine diameter fibers from outside the cylindrical beam in the form of a plurality of streams of binder, said streams of binder being directed into the cylindrical beam of fibers at a vortex of the beam, said vortex being spaced from said rotating member and having a reduced pressure within said beam, said streams of binder being directed in intersecting paths which oppose the spiraling of the fibers without materially affecting the advancement of the fibers toward the collection zone thereby intimately mixing the binder and fibers, collapsing the advancing cylindrical beam of fibers by directing jets of air against said beam, and collecting the fine diameter fibers and binder upon a collecting surface, said binder depositing out upon the fiber surfaces already collected.

3. In a centrifugal fiber-forming process comprising directing a stream of molten material onto a rotating member whereupon radially extending fibers are formed from a plurality of streams of molten material by centrifugal force, and attenuating said radially extending primary fibers by directing an annular blast toward said radially extending fibers to form an advancing cylindrical beam of spiraling, fine diameter fibers, the improvement comprising the steps of splitting one side of said cylindrical beam and opening up said beam of fibers to form a sheet-like veil of fibers advancing toward a collection zone, directing a plurality of streams of binder into the advancing fibers as the cylindrical beam is split and spread into an advancing sheet-like veil of fibers, directing a jet of air into the advancing veil of fibers and collecting the advancing fibers upon a surface in the form of a flat sheet of fibers.

4. In fiber-forming equipment for fiberizing a molten stream of glass and directing a spiraling, generally cylindrical beam of fibers toward a collection chain, applicator means for applying a binder to the fibers within the cylindrical beam as the fibers are directed toward the collection chain, said applicator means comprising a nozzle having a plurality of ports disposed within said nozzle in a side by side relationship, said ports being drilled to direct streams of binder in a pin wheel arrangement of streams that pass outwardly from said nozzle into said cylindrical beam of fibers, and air jet means disposed between said nozzle and said collection chain for directing a plurality of streams of air into the cylindrical beam of fibers.

5. In fiber-forming equipment for fiberization of a molten stream of glass and direction of a spiraling, generally cylindrical beam of fibers toward a collection zone, nozzle means for directing a plurality of streams of binder into the cylindrical beam of fibers, said nozzle means comprising a generally cylindrical member having a tapered surface in which are disposed a plurality of ports for passage of binder, said ports being so disposed to form a pin wheel pattern of streams of binder issuing from said nozzle means into said cylindrical beam of fibers.

References Cited in the file of this patent

UNITED STATES PATENTS

| | | |
|---|---|---|
| 2,124,768 | Drill et al. | July 26, 1938 |
| 2,192,944 | Thomas | Mar. 12, 1940 |
| 2,328,714 | Drill | Sept. 7, 1943 |
| 2,399,383 | Powell | Apr. 30, 1946 |
| 2,497,369 | Peyches | Feb. 14, 1950 |
| 2,609,566 | Slayter | Sept. 9, 1952 |
| 2,624,912 | Heymes | Jan. 13, 1953 |
| 2,641,028 | Steele | June 9, 1953 |
| 2,647,851 | Schwartz | Aug. 4, 1953 |
| 2,707,690 | Pearson | May 2, 1955 |
| 2,707,847 | Anliker | May 10, 1955 |